United States Patent Office 3,637,834
Patented Jan. 25, 1972

3,637,834
OXIDATION OF OLEFINES TO UNSATURATED ALDEHYDES AND UNSATURATED ACIDS
Gianfranco Pregaglia, Milan, Marco Agamennone, Novara, Nicola Santangelo, Milan, and Mauro Croci, Novara, Italy, assignors to Montecatini Edison S.p.A., Milan, Italy
No Drawing. Filed May 14, 1968, Ser. No. 728,915
Claims priority, application Italy, May 16, 1967, 16,134/67, Patent 796,268
Int. Cl. C07c 57/04
U.S. Cl. 260—533 N    7 Claims

ABSTRACT OF THE DISCLOSURE

Propylene and isobutene are oxidized in the vapor phase to unsaturated aldehydes and unsaturated acids, with the aid of a catalyst essentially constituted by tellurium and a monophase system based on molybdenum anhydride the crystalline lattice of which is altered due to the random substitution of some of the molybdenum atoms by atoms of a metal Ms selected from the group consisting of Ni, Mn and Co, and in which the atomic ratio Ms/Mo is 1:9.

THE PRIOR ART

The oxidation of olefines for the production of unsaturated aldehydes and unsaturated acids has been the object of numerous patents. Generally the catalysts used are based on molybdates (para-, iso- and heteromolybdates of cobalt, nickel, vanadium, iron, cerium, titanium, tin, antimony, etc.), optionally in the presence of particular activators such as phosphorus, tellurium, boron, etc. Catalytic systems comprising oxygenated compounds of Sn, Sb, As and Cu, as well as mixtures of oxides of molybdenum, of nickel, of cobalt, etc. in suitable ratios have also been used.

THE PRESENT INVENTION

One object of the present invention was to provide a new type of catalyst for the oxidation of propylene and isobutene.

Another object was to provide a process for oxidizing propylene and isobutene, in contact with the new catalyst, to the corresponding alpha-beta-unsaturated aldehydes, and the latter to the corresponding unsaturated acids.

These and other objects are accomplished, in accordance with the invention, by oxidizing propylene and isobutene in contact with a catalyst based on molybdenum trioxide but having a crystalline structure which is altered, as compared to that of the anhydride, due to the random substitution of some of the molybdenum atoms by atoms of a metal Ms which is nickel, manganese, or cobalt, and in which the atomic ratio Ms/Mo is 1:9.

The catalyst also comprises from 0.1% to 10% of tellurium (either as the metal or a suitable compound thereof), which functions to increase the catalytic activity of the system.

The catalysts of the invention differ from mechanical mixtures of the metal oxides having the same atomic ratio in being single phase systems having a well-defined structure which corresponds to the octahedric lattice of molybdenum anhydride in which some of the molybdenum atoms are substituted at random by atoms of one of the transition metals, Ni, Mn, Co.

The defective structure of the single-phase systems is recognized in the literature. Thus, the substantial difference between the structure of the single-phase system Ni/Mo=1:9 and a mechanical mixture of nickel oxide and molybdenum trioxide in the atomic ratio 1:9 has been corroborated. [See A. M. Liquori, B. Pispisa-La Ricerca Scientifica, 34 IIA, vol. 6, 1964, p. 635.]

The difference is revealed by examination of the respective X-ray diffraction patterns. Thus, on X-ray examination, the mechanical mixture shows both the refraction lines typical of molybdenum trioxide and the refraction lines typical of nickel oxide. In contrast, on X-ray examination, the single-phase system used as catalyst in the present oxidation process, shows a spectrum like that of molybdenum trioxide, without the characteristic lines for nickel oxide.

The X-ray examination confirms that these single-phase systems which we have found to be effective catalysts for the oxidation of propylene and isobutene to the alpha-beta-unsaturated aldehydes and unsaturated acids, have a crystalline structure which distinguishes them from catalytic systems based on molybdenum heretofore used for promoting the oxidation of olefins and unsaturated aldehydes to the corresponding oxygenated unsaturated compounds.

The particular lattice structure of these single-phase systems of mixed oxides is responsible for the catalytic activity of the systems in the present process. In fact, the mechanical mixtures of molybdenum trioxide with the oxide of Ni, or of Mn, or of Co, in which the atomic ratio Ms/Mo is 1:9, have definitely inferior catalytic properties, and result in low conversions, the formation, prevailingly, of CO and $CO_2$, as demonstrated in working examples given hereinbelow.

The main advantages of the catalysts used in the practice of this invention are:

the possibility of operating at lower temperatures and for shorter contact times than could be used satisfactorily with prior art catalysts;

the fact that high conversion of the olefins (and/or of the unsaturated aldehydes) can be obtained, while still directing the oxidation to the selective production of desired, useful products;

the fact that only negligible quantities of often difficultly separable undesirable byproducts (such as ketones and saturated acids having the same number of carbon atoms as the starting material) are produced; and the possibility of directing the reaction at will toward the production, prevailingly, of unsaturated aldehydes or unsaturated acids, by suitably varying the reaction conditions.

The molybdenum oxides structurally altered by nickel, manganese or cobalt atoms are prepared by the thermal decomposition of the isomorphous ammonium salts of the corresponding polymolybdic acid

$(NH_4)_6MsMo_9O_{32} \cdot 6H_2O$ in which Ms is Ni, Mn, or Co.

The decomposition of these salts is carried out at a temperature above 400° C. Usually, it is preferred to carry out the decomposition at about 500° C., unless particular problems involving modification of the specific surface of the catalyst make it advisable to operate at higher temperatures, up to 550° C. to 600° C.

The decomposition treatment may be protracted for from 5 to 20 hours. The temperature and duration of the thermal treatment are suitably chosen for imparting particular physical characteristics to the catalyst with respect to the operational conditions established for the oxidation.

Any method may be followed in preparing the ammonium salt of the nickel-, mangano- or cobalto-polymolybdic 1:9 acid, provided the salt obtained corresponds to the formula $(NH_4)_6MsMo_9O_{32} \cdot 6H_2O$ wherein Ms represents Ni, Mn or Co.

A suitable method consists in mixing at boiling point three aqueous solutions of: sulfate of the substituent metal MsSO$_4$, ammonium paramolybdate $$(NH_4)_6Mo_7O_{24} \cdot 4H_2O$$

and ammonium persulphate $(NH_4)_2S_2O_8$; for 1 mole of sulphate MsSO$_4$ are generally used from 1.5 to 4 moles of paramolybdate and from 3 to 9 moles of persulphate. During this reaction, the oxidation of the substituent metal Ms (from valence 2 to valence 4) also occurs, by the action of the persulphate. Other oxidizers may be used instead of the persulphate.

From the cooled solution a crystalline solid precipitates, which is separated, washed with a small amount of cold water and optionally recrystallized from water. The crystals thus obtained are constituted by the ammonium salt of the metal-polymolybdic hexahydrate acid $(NH_4)_6MsMo_9O_{32} \cdot 6H_2O$.

Further details are given in the examples.

As already mentioned, the addition of metal tellurium or of one of its compounds considerably improves the catalytic properties of the oxide of Mo, increasing both the selectivity of the catalyst and the speed of the oxidation reaction. The amount of tellurium to be added to the catalyst may vary within rather wide limits, but good results are already obtained when the tellurium content is 0.1% by weight. The positive action of the tellurium shows itself also at considerably higher concentrations, for instance 10%, although the use of intermediate concentrations, such as from 1% to 5%, is advantageous.

Since metallic tellurium and its compounds have a certain volatility under oxidation conditions, it can be desirable to incorporate a relatively large amount of tellurium in the catalyst, for prolonging the activity thereof.

The tellurium may be introduced into the catalyst in the form of the metal, of an oxide, or of any other suitable compound. Satisfactory results are actually achieved by using tellurium dioxide, tellurides, or salts of oxygenated tellurium acids; for instance, for this purpose were used MoTe$_2$, NiTe$_2$, CoTe$_2$, NiMoTe$_4$, AgBiTe$_2$, Cu$_2$Te, Ag$_2$Te, Bi$_2$Te$_3$, tellurates and tellurites of nickel, cobalt, etc.

The tellurium or compound thereof may be added during the preparation of the ammonium salt of the metal-polymolybdic acid. However, it is preferred to add it to the catalyst at one of the later stages in its preparation. In particular, it may be admixed in suitable ratios with the ammonium salt before the latter is decomposed or it may be added directly to the molybdenum oxide structurally altered by cobalt, nickel, or manganese.

The catalyst of this invention, modified by the addition of small quantities of tellurium or its compounds, may be used in bulk or may be used in diluted form. It may also be deposited on a suitable carrier following the technique most suited for the type of support selected. Various carriers of different kinds may be used, such as silica, Carborundum, pumice stone, etc.

By using said catalyst it is possible to direct the oxidation towards the exclusive production of the unsaturated acid. In this case, the unsaturated aldehyde, separated from the reaction gases, is re-cycled to the reactor so as to increase the production of unsaturated acid.

The catalyst is very reactive and effective at relatively low temperatures. Even at 280° C. there sets in the formation of useful oxidation products. However, in order to attain a reaction velocity of practical interest it is convenient to operate at over 300° C. On the other hand, temperatures as high as 500° to 550° C. are generally avoided, because at such temperatures the reaction is very fast and therefore difficult to control and, moreover, the life of the catalyst is shortened.

The oxidation may be carried out at either atmospheric pressure or under higher pressure (from 2 to 10 atm.) in order to increase the production of—acrylic derivatives.

The contact times necessary for obtaining interesting conversions of olefins or aldehydes are comprised within a very wide range, from 0.05 second to 5 seconds, depending on the temperature chosen for the oxidation. As is apparent from the examples, for temperatures comprised between 350° C. and 450° C., the contact time varies inversely with the temperature and is from 2 seconds to 0.5 second.

The molar ratio between reactant and oxygen depends on the nature of the reactant and on the desired degree of oxidation.

The molar ratio olefin/oxygen or unsaturated aldehyde/oxygen or olefin+unsaturated aldehyde/oxygen (in case of a recycle of aldehyde) may vary between 1:0.5 and 1:3, preferably between 1:1 and 1:2.5.

For instance, if it is desired to oxidize propylene prevailingly to acrylic acid with conversions in the order of 70–90%, it is advisable to operate with a ratio $C_3/O_2=1:2$; if, on the contrary, the acrolein is to be converted to acid, a ratio $C_3/O_2$ equal to 1:1 will give good results.

The oxygen necessary for the reaction is fed in as pure oxygen, as air, or as a mixture of both. The oxidation is preferably conducted in the presence of an inert gas as diluent in a concentration of from 20–60% by volume of the reacting mixture. For this purpose there may be used steam, nitrogen, carbon dioxide, propane or other saturated hydrocarbons. The tail gas of the cycle itself, after recovery of the useful products, is usable as diluent of the feeding charge.

The catalyst of this invention may be used either in a fixed bed or in a fluid bed. Due to its particular inertia towards paraffins, it is possible to feed olefins containing paraffins as impurities into the reactor, without having the impurities react during the oxidation.

The performance of the catalyst can be improved by adding to the catalytic system small quantities of alkaline metals in the form of salts, oxides, etc., which modify the course of the oxidation. Good results have been achieved by introducing into the catalyst the tellurium or a part of it in the form of potassium telluride or sodium telluride.

The presence of halogenated organic derivatives, such as for instance allyl chloride, allyl bromide, etc. may improve the results of the oxidation without substantially modifying the course of the reaction.

The oxidation may be carried out either in one single reactor or in a series of reactors. When using more than one reactor, it is possible to adopt different operational conditions for each reactor in order to obtain the best possible results. In the case of two reactors, the aldehyde to be recycled is preferably introduced into the second reactor.

The following examples, in which the composition of the gaseous mixtures are expressed in percent by volume, are given to illustrate the invention and are not intended as limiting.

EXAMPLE 1

A batch of catalyst was prepared according to the following procedure:

An ammonium persulphate solution at 60° C., containing 685 g. of salt in 1600 cc. of water, was added to 1800 cc. of a boiling solution of 4.2% of nickel sulphate. The solution thus obtained was poured, still hot, into 3800 g. of boiling water containing dissolved in it 1270 g. $(NH_4)_6Mo_7O_{24}.24H_2O$.

After having brought the mass to boiling point for 3–4 minutes, the suspension was rapidly cooled to 50° C. and filtered at this temperature. The black crystalline precipitate, separated by filtering, was recrystallized from hot water, then dried at 110° C., and finally calcined in a muffle furnace for 16 hours at 500° C.

The yellow-green powder thus obtained was mixed homogeneously with about 1.8% by weight of $TeO_2$; small quantities of water were added to it, it was then extruded, dried at 110° C. and formed into 3 x 3 mm. cylinders.

A gaseous mixture consisting of 5% of propylene, 55% of air and 40% of steam, was fed at a rate of 220 l./h. into a reactor containing 230 cc. of this catalyst kept at 400° C. The reaction gases contain, besides nitrogen, oxygen and water, also acrylic acid, acrolein, carbon monoxide, carbon dioxide and minor quantities of other carbonylic compounds; the gases are cooled and continuously washed with water. The solution thus obtained was distilled in order to separate the acrolein from the acrylic acid.

From the oxidation balance it results that 96% of the propylene introduced into the reactor was converted and, for 37% selectively to acrylic acid and for 38% selectively to acrolein; about 18% of carbon oxides ($CO+CO_2$) were produced.

EXAMPLE 2

A batch of catalyst was prepared according to the procedure described in Example 1, except that instead of 1.8% of $TeO_2$, 2% of $NiMoTe_4$ were added.

Iinto a reactor containing 230 cc. of the catalyst thus prepared and maintained at 400° C., was fed in at a rate of 200 l./h. a gaseous mixture consisting of 5% of propylene, 55% of air and 40% of steam. The exhaust gases were treated as described in Example 1.

From the oxidation balance it results that 93% of the propylene introduced into the reactor had been converted, while the selectivities in acrylic acid, in acrolein and in carbon oxides ($CO+CO_2$) were respectively 25%, 62% and 9%.

EXAMPLE 3

Through 230 cc. of the catalyst as described in Example 1, maintained at 370° C., were passed 220 l./h. of a gaseous mixture having the composition given in Example 1. An 86% conversion of the propylene was ascertained; the selectivities in acrylic acid, in acrolein and in carbon oxides were respectively 26%, 48% and 13%.

For purposes of comparison, the same feed charge was passed under equal conditions through a catalyst consisting of a mechanical mixture of NiO, $MoO_3$ and $TeO_2$ in the same atomic ratios of the catalyst of Example 1; the conversion of the propylene was only 10% and there was practically no formation of acrylic acid.

EXAMPLE 4

Through 230 cc. of the catalyst of Example 1, maintained at 400° C., were passed 220 l./h. of an air-steam-nitrogen mixture containing 5% of acrolein, 5% of oxygen and 40% of steam. The conversion to acrolein was around 68%, with selectivities in acrylic acid and carbon monoxides of 60% and 24% respectively.

EXAMPLE 5

By using a catalyst as described in Example 1, the separation of the reaction products was modified by recycling the acrolein produced into the reactor.

There was fed into the reactor, at a rate of 220 l./h., a gaseous mixture consisting of 5% propylene, 55% air and 40% steam, together with the acrolein vapours already separated from the reacted gases. Under operational conditions, a conversion of propylene of 90% was reached while the selectivity in acrylic acid rose to about 65%.

EXAMPLE 6

230 cc. of a catalyst as described in Example 1 were tested at 370° C. with 220 l./h. of a gaseous mixture constituted by 5% of isobutene, 55% of air and 40% of steam. About 60% of the isobutene was converted, with selectivities in methacrylic acid and in methacrolein of 5% and 25% respectively.

EXAMPLE 7

To a boiling solution of manganous sulphate (80.5 g. of $MnSO_4.H_2O$ in 400 cc. of water) was added a warm (60° C.) solution of ammonium persulphate [402 g. of $(NH_4)_2S_2O_8$ in 1200 cc. of water]. The darkened hot mixture was rapidly poured into a boiling solution of ammonium paramolybdate [200 g. of $(NH_4)_6Mo_7O_{24}.4H_2O$ in 4850 cc. of water]. After the whole was brought to, and maintained at boiling temperature for a few minutes, the suspension thus obtained was cooled down to 50° C. The orange-red crystals of $(NH_4)_6MnMo_9O_{32}.6H_2O$ were then filtered off and, after recrystallization from water and drying at 110° C., were calcined in a muffle furnace for 16 hours at 500° C. The calcined yellow powder was then uniformly mixed with 1.8% by weight of tellurium oxide, small quantities of water were added, and the mass was extruded and finally formed into small 3 x 3 mm. cylinders that were then dried at 110° C.

Through 230 cc. of this catalytic mass, placed into a tight reactor at 450° C., were passed 220 l./h. of a gaseous mixture constituted by 5% of propylene, 55% of air and 40% of steam. The exhaust gases, besides the olefin, the non-converted oxygen and the inerts, contained also acrylic acid, acrolein, carbon monoxide, carbon dioxide and minor quantities of other carbonylic compounds. The gas was cooled and continuously washed with water in order to absorb the organic products. The solution thus obtained was distilled, also in a continuous way, in order to separate the acrolein from the acrylic acid.

From the oxidation balance it turned out that the propylene had been converted to 60% and that the selectivities in acrylic acid, acrolein and carbon oxides were 20%, 56% and 14% respectively.

EXAMPLE 8

A batch of catalyst was prepared according to the procedure specified in Example 1, except for the $TeO_2$ which constituted 8% of the catalyst.

Into a reactor containing 230 cc. of the catalyst at 400° C., were introduced 110 l./h. of a gaseous mixture consisting of 5% propylene, 55% of air and 40% of steam; the exhaust gases were treated as in Example 1. From the oxidation balance it turned out that 98% of the propylene introduced into the reactor had been converted and that the selectivities in acrylic acid, in acrolein and in carbon oxides were 39%, 32% and 17% respectively.

EXAMPLE 9

25 volumes of a 25% solution ammonium molybdate, 8 volumes of a 30% solution of ammonium persulphate and 8 volumes of a 7% solution of cobalt sulphate were mixed together, brought to boiling and then maintained under these conditions for about 2 minutes. The solution was cooled to 65° C. and the ammonium salt of the cobaltopolymolybdic acid was separated by filtration. This salt was dried at 110° C. and finally calcined in a muffle furnace for 16 hours at 500° C. To the pink-gray powder thus obtained were added 1.8% by weight of $TeO_2$ and small quantities of water; it was then extruded and formed into small 3 x 3 mm cylinders which were dried at 110° C. Through 220 cc. of this catalyst, maintained at 390° C., was passed at 220 l./h. a gaseous mixture constituted by 5% propylene, 55% air and 40% steam. The reaction gases, containing acrylic acid, acrolein, carbon monoxide, carbon dioxide and minor quantities of other carbonylic compounds, were treated by the technique described in Example 1.

From the oxidation balance it appeared that 90% of the propylene fed into the reactor had been converted; the selectivities in acrylic acid, in acrolein and in carbon monoxides were 39%, 40% and 15% respectively.

EXAMPLE 10

150 l./h. of a gaseous mixture consisting of 7% propylene, 12.6% oxygen, 52.4% nitrogen and 28% steam, were fed into a reactor containing 220 cc. of a catalyst as described in Example 1 and maintained at 413° C. The reaction gases were sent directly to the gas-chromatographic analysis.

From the oxidation balance it results that 96% of the fed propylene was converted, while the selectivities in acrylic acid, acrolein and carbon oxides were respectively 47%, 35% and 16.8%.

EXAMPLE 11

Through 220 cc. of a catalyst as described in Example 1, maintained at 408° C., were passed 150 l./h. of a gaseous mixture consisting of 5% propylene, 9% oxygen, 46% nitrogen and 40% steam. The reaction gases were sent directly for gas-chromatographic analysis.

From the oxidation balance it results that the conversion of the fed propylene was 99.6% and that the selectivities in acrylic acid, acrolein and carbon oxides were respectively 53.8%, 21.3% and 21.2%.

EXAMPLE 12

30 g. of the salt $(NH_4)_6 NiMo_9O_{32} \cdot 6H_2O$, ammonium nickelgpolymolybdate 1:9, as obtained in Example 1 were dissolved in 1000 cc. water by heating at 95° C. under stirring.

This solution was used to impregnate 580 g. of a silica aerogel ("Aerosil 380," produced by Degussa), having a specific surface area of 380 m.²/g. The paste was dried at 110° C. The imbibition was repeated many times until the active portion of the supported catalyst had the desired value. The final dry mixture was activated by heating at 500° C. for 8 hours.

The calcined product was finely ground and homogeneously mixed with $TeO_2$, in amount of 1.8% by weight of the active portion. The mixture, after the addition thereto of a small quantity of water, was extruded, dried at 110° C. and formed to cylinders of 3 x 3 mm.

Many supported catalysts, having different percentages of active portion, have been prepared by this method. These catalysts have been tested at the following conditions: apparent catalyst volume 220 cc. feed to the gaseous mixture 110 l./h., composition 5% propylene, 55% air, 40% steam (as in Example 1), temperatures 400–420–440° C. The results are shown in the following table.

| Carrier (wt. percent) | Active portion (wt. percent) | Temp. (° C.) | Conversion, percent | Selectivity, percent | | |
|---|---|---|---|---|---|---|
| | | | | Acrylic acid | Acrolein | CO+CO₂ |
| 80 | 20 | 400 | 46.1 | 5.4 | 80.4 | 11.6 |
| | | 420 | 66.0 | 7.6 | 74.6 | 14.3 |
| | | 440 | 80.3 | 13.7 | 63.5 | 19.5 |
| 70 | 30 | 400 | 69.9 | 16.3 | 67.0 | 12.3 |
| | | 420 | 86.1 | 25.5 | 54.2 | 15.7 |
| | | 440 | 93.2 | 36.9 | 42.3 | 16.5 |
| 60 | 40 | 400 | 87.7 | 38.9 | 39.4 | 14.9 |
| | | 420 | 93.0 | 44.0 | 28.0 | 21.4 |
| | | 440 | 96.5 | 47.4 | 18.8 | 28.9 |
| 50 | 50 | 400 | 88.5 | 44.5 | 31.8 | 19.7 |
| | | 420 | 92.8 | 50.6 | 26.0 | 20.3 |
| | | 440 | 98.6 | 54.3 | 12.7 | 30.5 |
| 40 | 60 | 400 | 86.2 | 34.7 | 47.0 | 14.0 |
| | | 420 | 92.7 | 40.8 | 42.0 | 16.5 |
| | | 440 | 97.6 | 51.7 | 24.8 | 20.0 |
| 20 | 80 | 400 | 78.0 | 42.3 | 38.3 | 16.3 |
| | | 420 | 89.6 | 50.3 | 22.4 | 25.8 |
| | | 440 | 95.5 | 47.6 | 8.9 | 41.0 |

As it appears from the table, the best results are obtained with the supported catalysts having an active portion from 40 to 60% by weight.

EXAMPLE 13

A catalyst prepared as in Example 1 was tested at the same conditions in a long-duration run.

Conversions and selectivities, at the beginning and after 800 hours, were as follows:

| Time, hrs | 0 | 400 | 800 |
|---|---|---|---|
| Propylene conversion, percent | 95 | 83 | 81 |
| Selectivity in, percent: | | | |
| Acrylic acid | 38 | 36 | 36 |
| Acrolein | 37 | 36 | 37 |
| Carbon oxides | 16 | 15 | 15 |

EXAMPLE 14

The catalyst of Example 2 was tested at the same conditions in a long-duration run.

| Time hrs | 0 | 300 | 850 | 1,500 |
|---|---|---|---|---|
| Propylene conversion, percent | 93 | 83 | 80 | 85 |
| Selectivity in, percent: | | | | |
| Acrylic acid | 25 | 22 | 25 | 34 |
| Acrolein | 62 | 57 | 53 | 40 |
| Carbon oxides | 9 | 9 | 12 | 19 |

It will be apparent that changes and variations in details may be made in practicing the invention, without departing from the scope thereof. Thus, the process can be applied directly to acrolein or methacrolein for the production of acrylic and methacrylic acids. Therefore, we intend to include in the scope of the appended claims all modifications which will be obvious to those skilled in the art from the description and working examples given herein.

What is claimed:

1. A process for preparing acrylic acid and/or the aldehyde acrolein from propylene; or for preparing methacrylic acid and/or the aldehyde methacrolein from isobutene, by oxidation with oxygen, in vapor phase, of the propylene or isobutene, characterized in that the oxidation is carried out at a temperature between 300° C. and 550° C. for a contact time of 5 seconds to 0.05 second, in the presence of a catalyst essentially constituted by 0.1% to 10% of tellurium and by a mono-phase system based on molybdenum anhydride the lattice of which is altered due to the random substitution of molybdenum atoms by atoms of a substituent metal (Ms) selected from the group consisting of manganese, nickel and cobalt, and in which the atomic ratio Ms/Mo is 1:9.

2. The process according to claim 1, further characterized in that the oxidation is carried out at a temperature between 350° C. and 450° C. for a contact time between 2 seconds and 0.5 second.

3. The process according to claim 1, further characterized in that the molar ratio of propylene or isobutene to oxygen is comprised between 1:0.5 and 1:3.

4. The process according to claim 1, further characterized in that the molar ratio of propylene or isobutene to oxygen is comprised between 1:1 and 1:2.5.

5. The process according to claim 1, further characterized in that a mixture of propylene or isobutene and oxygen is diluted with an inert gas.

6. A process for the preparation of acrylic acid from acrolein characterized in that the acrolein is oxidized with oxygen at a temperature comprised between 300° C. and 500° C. in the presence of a catalyst essentially constituted by 0.1% to 10% of tellurium and by a monophase system based on molybdenum anhydride the lattice of which is altered due to the random substitution of molybdenum atoms by atoms of a substituent metal (Ms) selected from the group consisting of manganese, nickel and cobalt, and in which the atomic ratio Ms/Mo is 1:9.

7. A process for preparing methacrylic acid from methacrolein characterized in that the methacrolein is oxidized with oxygen at a temperature comprised between 300° C. and 500° C. in the presence of a catalyst essentially constituted by 0.1% to 10% of tellurium and by a monophase system based on molybdenum anhydride the lattice of which is altered due to the random substitution of molybdenum atoms by atoms of a substituent metal (Ms) selected from the group consisting of manganese, nickel and cobalt, and in which the atomic ratio Ms/Mo is 1:9.

References Cited
UNITED STATES PATENTS 3,240,806   3/1966   Bethell et al. _____ 260—533
3,435,069   3/1969   Bethell et al. _____ 260—533 N LORRAINE A. WEINBERGER, Primary Examiner R. D. KELLY, Assistant Examiner U.S. Cl. X.R.

252—439; 260—530 N, 604 R